United States Patent [19]

Dickens

[11] 4,144,296
[45] Mar. 13, 1979

[54] PROCESS FOR MOLDING A POLYSTYRENE FOAM STRUCTURE WITH A BONDED COVERING

[75] Inventor: Luther I. Dickens, Radford, Va.

[73] Assignee: The Mead Corporation, Dayton, Ohio

[21] Appl. No.: 698,966

[22] Filed: Jun. 23, 1976

[51] Int. Cl.² .................... B29D 27/04; B29D 3/00
[52] U.S. Cl. ............................... 264/45.4; 264/46.5; 264/46.8; 264/135; 264/261; 264/265; 264/277
[58] Field of Search .............. 264/265, 267, 337, 46.4, 264/46.6, 46.8, 46.5, 45.4, 46.7, 261, 259, 275, 277, 278, 135; 156/333, 334; 425/4 R, 817, 129 R

[56] References Cited

U.S. PATENT DOCUMENTS

| | | | |
|---|---|---|---|
| 2,977,639 | 4/1961 | Barkhuff et al. | 264/45.4 |
| 3,000,058 | 9/1961 | Thielen | 264/45.4 |
| 3,119,129 | 1/1964 | Evans et al. | 264/45.4 |
| 3,163,686 | 12/1964 | Dusel et al. | 264/46.6 |
| 3,425,978 | 2/1969 | Armour | 156/333 |
| 3,485,347 | 12/1969 | McGill et al. | 264/46.5 |
| 3,531,552 | 9/1970 | Getz et al. | 264/46.7 |
| 3,546,841 | 12/1970 | Smith et al. | 264/46.8 |
| 3,589,967 | 6/1971 | Shirakawa | 264/46.8 |
| 3,845,183 | 10/1974 | Harrison | 264/46.6 |

FOREIGN PATENT DOCUMENTS 47-46457  11/1972  Japan ..................... 264/46.4

OTHER PUBLICATIONS

Thompson, Gum Plastics, Reinhold, N.Y., (1958), pp. 60–63, 112 & 113.

*Primary Examiner*—W.E. Hoag
*Attorney, Agent, or Firm*—Harold L. Marquis

[57] ABSTRACT

A process for molding in situ a polystyrene foam structure with a relatively rigid thermoplastic sheet covering a portion of the surface of the polystyrene foam. The thermoplastic sheet is cut and folded into proper shape and a heat-activated adhesive applied to the inside surface. The folded sheet is inserted into the female cavity of a mold which is then closed. Expandable polystyrene is injected into the interior of the folded sheet and heated to expand the polystyrene against the sheet and the adhesive is heat-activated to bond the sheet and polystyrene.

6 Claims, 5 Drawing Figures

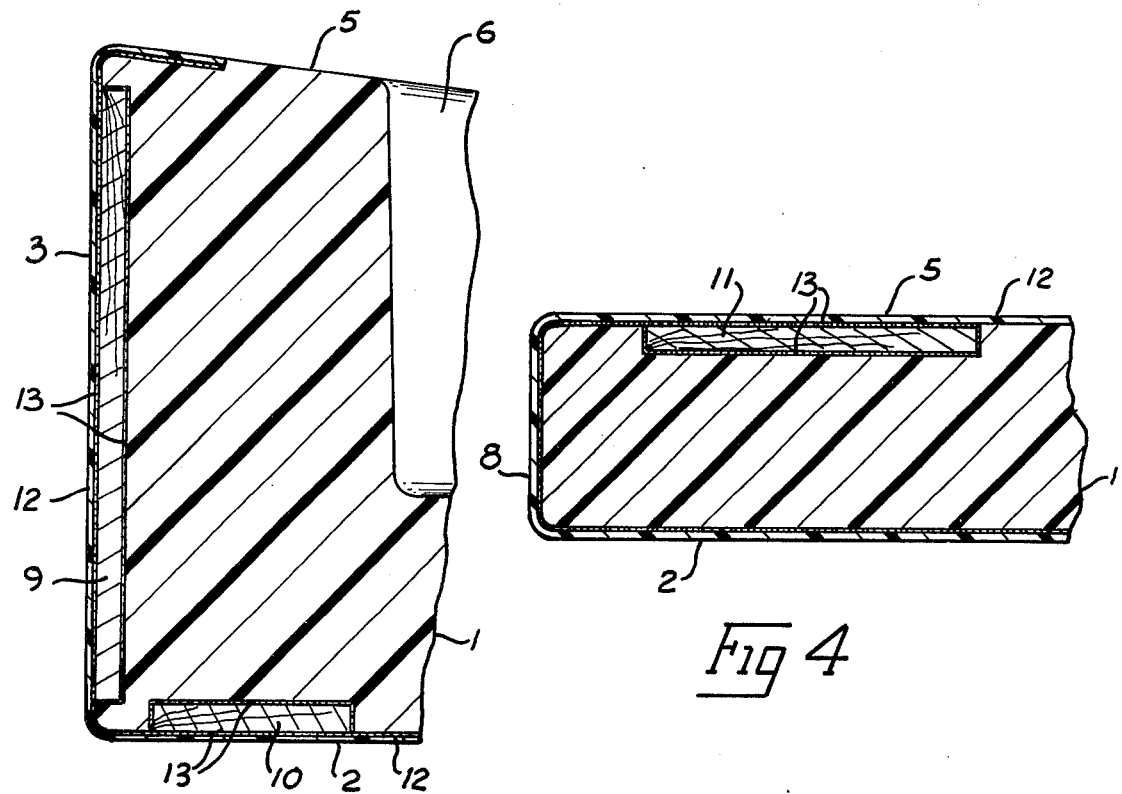

PROCESS FOR MOLDING A POLYSTYRENE FOAM STRUCTURE WITH A BONDED COVERING

BACKGROUND OF THE INVENTION

Solid plastic foam structures have been used for some time as load-bearing supports, such as for merchandise supports as disclosed in Bustos U.S. Pat. No. 3,939,987. While such supports are lightweight and inexpensive, they suffer from two serious disadvantages. The plastic base does not have sufficient compressive strength to support a heavy load of merchandise. Secondly, the plastic foam is easily dented or torn during use. While reinforced sheet material, such as plywood, can be applied to the load-bearing surface of the support by adhesive tape, the base is not very attractive and the tape tends to loosen with use. Plastic sheet material can be laminated to the foam support after it is formed, but it is very difficult to laminate the plastic sheet so that it is smooth, especially at the corners and edges.

SUMMARY OF THE INVENTION

In this invention a polystyrene foam structure is molded in situ with a relatively rigid thermoplastic sheet bonded to a portion of the outside surface of the polystyrene. A thermoplastic sheet coated with a heat-activated adhesive is cut and folded into proper shape. The folded sheet is inserted into the female cavity of a mold. After the mold is closed, expandable polystyrene molding material is injected into the interior of the folded sheet and heated by steam to expand the polystyrene against the mold. This heating process also activates the adhesive to bond the sheet and polystyrene. The mold is then cooled and the formed structure removed.

DESCRIPTION OF THE DRAWINGS

FIG. 4 is a cross-sectional view along lines 4—4 of FIG. 1.

FIG. 5 is an enlarged view of area 5 of FIG. 2.

Figure 1:
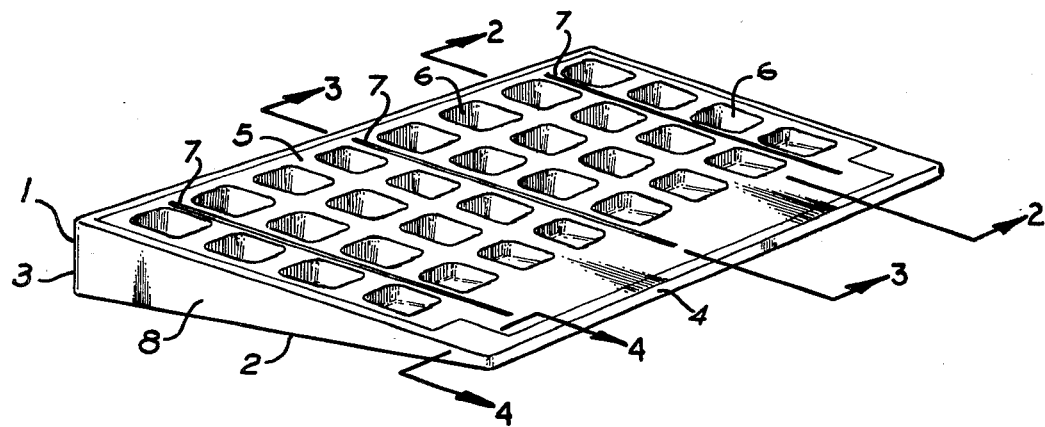
FIG. 1 is a perspective view of the bottom of a merchandise support base produced in accordance with the process of the present invention.
Figure 2:
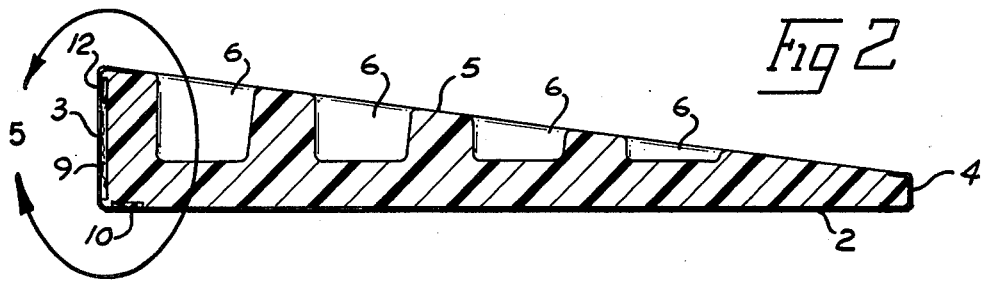
FIG. 2 is a cross-sectional view taken along lines 2—2 of FIG. 1.
Figure 3:
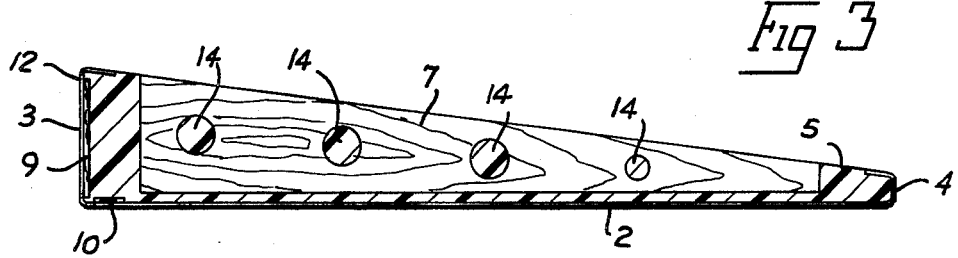
FIG. 3 is a cross-sectional view along lines 3—3 of FIG. 1.

The merchandise support base produced by the process of this invention is shown in FIG. 1 as designated by reference number 1. It is constructed from polystyrene foam having a flat top 2 which tapers from a thick edge 3 to a thin edge 4. The bottom 5 of the base 1 is molded wth cavities 6 to save material and reduce weight. Reinforcing ribs 7 of any relatively inflexible material, such as plywood or steel, may be embedded in the polystyrene foam between rows of cavities 6 in spaced transverse relationship to the base 1 in order to strengthen the base. These reinforcing ribs 7 can also be located in spaced longitudinal relationship to the base 1. These reinforcing ribs 7 may not be needed in the fabrication of a foam support back which is otherwise constructed in the same way.

The top 2, edges 3 and 4, and sides 8 of the support are covered by a sheet of relatively rigid thermoplastic material 12 as shown in FIG. 5. The sheet may also extend a short distance around the periphery of the bottom 5 of the support. The thermoplastic sheet may be a polystyrene, polyethylene, polypropylene or rigid vinyl polymer. An acrylonitrile-butadiene-styrene polymer (commonly known as ABS plastic) is preferred.

Molding Process

In fabricating the support, the thermoplastic sheet (approximately 30 mil) is first die cut to the proper dimensions to cover the top, edges, and sides and a portion of the bottom. The sheet is then scored at the fold lines and a compatable heat-activated adhesive 13 (as shown in FIG. 5) is brushed or sprayed on the inside surface of the sheet. While a number of heat-activated adhesives can be used, a neoprene adhesive is preferred with ABS sheet. The sheet is then folded into proper shape. A bumper plate 9 of a relatively inflexible material such as plywood, wood, particle board, heavy paperboard or fabricated plastic, may be inserted on the inside of the thick edge 3 of the support to provide additional support and protection against damage when it is resting on the floor with the thick edge to the traffic. A similar top plate 10 may be used to protect the surface of the top 2 near the thick edge 3. The bumper plate 9 and top plate 10 may be a single unitary structure. The bumper plate 9 and top plate 10 are also coated with a heat-activated adhesive 13 as shown in FIG. 5.

A bottom plate 11 may be coated with adhesive and attached to the inside flap of the sheet on the bottom of the support. The bottom plates 11 are used to anchor fasteners which attach a similar back structure to the merchandise base.

The folded sheet is then placed in the female cavity of a steam chest mold with the interior of the folded sheet facing the male side of the mold. Several reinforcing ribs 7 may be attached to the male side of the mold when fabricating a base. These ribs have transfer holes 14 to permit the transfer of the plastic foam material throughout the mold during the molding process so that the density of the foam is uniform; these ribs are supported by the rigid foam to prevent buckling thereby increasing compressive strength of the unit. The mold is then closed and expandable polystyrene molding material is injected under pressure into the mold. The molding material may be in the form of powder, granules or beads. The molding material is preferably pre-expanded prior to its introduction into the mold. Steam is injected into the mold to soften and expand the polystyrene and to effect fusion of the polystyrene. The mold is vented to allow the circulation of the steam throughout the polystyrene. The expansion of the polystyrene forces the thermoplastic sheet tight against the mold surface. The interior of the female cavity may be heated to activate the adhesive but steam alone is usually sufficient. The mold is then cooled and structure removed. The expanded polystyrene has a density of from 1.5 to 2 lbs/cu. ft., which results in a light-weight structure.

A display rack can be constructed of the molded structure by locating the thick edge of a back upon the thin edge of the reinforced base. The back can be affixed to the base by fasteners attached to the bottom plate 11 of the base.

This molding process can be used to produce polystyrene structures of other shapes. Applying the covering thermoplastic sheet in situ during the molding process produces a strong bond between the sheet and polystyrene. Pressure from the expanding polystyrene stretches the sheet so that a smooth surface is formed.

Obviously, many other modifications are possible in light of the above teachings. It is therefore, to be understood that within the scope of the invention may be individual modifications and variations other than is specifically described.

The embodiments of the invention in which exclusive property or privilege is contained are defined as follows.

I claim:

1. A process for molding in situ in a mold with a female cavity and a male member a polystyrene foam structure with relatively rigid thermoplastic sheet bonded to at least a substantial portion of the top, edges, and sides of the structure which comprises:

(a) applying a heat-activated adhesive to one surface of a relatively rigid thermoplastic sheet, cutting the sheet to desired dimensions, and folding the sheet to form a folded sheet to the desired shape of the structure;

(b) inserting the folded sheet into the female cavity of a mold so that the coated surface is exposed to the male member of the mold and attaching a plurality of reinforcing ribs with a plurality of transfer holes to the male member of the mold before closing so that the ribs project perpendicular from the male member, said ribs having a depth at least equal to a major portion of the depth of the female cavity so as to reinforce the structure molded;

(c) injecting heat expandable polystyrene molding material into the interior of the folded sheet;

(d) heating the polystyrene sufficiently to expand it to fill the interior of the folded sheet with polystyrene being transferred through the transfer holes so the density of the structure molded is fairly uniform and to force the sheet against the interior surface of the female cavity and heating the adhesive so that the sheet is bonded to the polystyrene; and (e) removing the structure from the mold.

2. The process of claim 1 in which the sheet is an acrylonitrile-butadiene-styrene polymer.

3. The process of claim 1 in which a plate is coated with a heat-activated adhesive and inserted next to an interior surface of the folded sheet prior to molding.

4. The process of claim 1 in which score lines are formed on one surface of the sheet at the locations where it is to be folded.

5. The process of claim 4 in which the sheet is an acrylonitrile-butadiene-styrene polymer.

6. The process of claim 5 in which the heat-activated adhesive is a neoprene adhesive.

* * * * *